United States Patent [19]

Hostettler et al.

[11] Patent Number: 5,091,448
[45] Date of Patent: Feb. 25, 1992

[54] SUSPENDING MEDIUM FOR WATER SOLUBLE POLYMER

[75] Inventors: John E. Hostettler; Marshall D. Bishop, both of Bartlesville, Okla.

[73] Assignee: Phillips Petroleum Company, Bartlesville, Okla.

[21] Appl. No.: 513,539

[22] Filed: Apr. 24, 1990

[51] Int. Cl.⁵ .............................. C08J 9/42; C08J 3/02; C08F 2/16; C09K 7/00
[52] U.S. Cl. .................................. 524/45; 524/475; 524/491; 524/484; 524/486; 524/459; 524/501; 524/503; 523/130
[58] Field of Search ............... 524/801, 45, 475, 490, 524/491, 484, 485, 486, 503, 501, 459; 523/130

[56] References Cited

U.S. PATENT DOCUMENTS

| | | | |
|---|---|---|---|
| 3,780,195 | 12/1973 | Balassa | 424/491 |
| 3,922,240 | 11/1975 | Berg et al. | 524/45 |
| 4,435,217 | 3/1984 | House | 106/171 |
| 4,551,490 | 11/1985 | Doyle et al. | 524/55 |
| 4,569,955 | 2/1986 | Dhabhar | 523/120 |
| 4,726,912 | 2/1988 | Bishop et al. | 252/309 |
| 4,735,659 | 4/1988 | Bishop | 106/193 |
| 4,830,765 | 5/1989 | Perricone et al. | 252/8.51 |
| 4,855,335 | 8/1989 | Neperud | 524/271 |

Primary Examiner—Paul R. Michl
Assistant Examiner—Patrick Niland
Attorney, Agent, or Firm—J. E. Phillips

[57] ABSTRACT

A new stable liquid suspension of water soluble polymer, and a method of preparation are provided. Such compositions comprise of at least an iso-parrafinic oil medium, one styrene/isoprene copolymer, a water soluble polymer and preferably some hydrophobic fumed silica mixed together in the appropriate quantities and conditions.

26 Claims, No Drawings

SUSPENDING MEDIUM FOR WATER SOLUBLE POLYMER

BACKGROUND OF THE INVENTION

This invention relates to preparing stable suspensions of water soluble polymers.

Water soluble polymers suspensions are commonly used for oil field drilling fluids and cementing applications.

The industry goal has been, and still is, to improve on the process of making and using these suspensions, and also to improve on their intrinsic efficiency. By the term intrinsic efficiency is meant to eliminate or substantially minimize the formation of agglomerates that do not hydrate easily.

Attempts to meet the above stated goals are known in the art. Such efforts have employed a wide variety of methods and agents inclusive of organophyllic clay, water, surfactants, fatty acids, and a specially prepared controlled moisture content polymer. Although these methods and/or compositions individually and collectively have improved on the art, the ultimate goal of providing an ideal suspension i.e. one which is easy to manufacture, remains stable and is useable over a wide temperature range, remains to be met.

SUMMARY OF THE INVENTION

It is a general object of this invention, to provide a superior suspension of a water soluble polymer.

It is also another object of this invention to provide a stable liquid suspension of a water soluble polymer.

It is a further object of this invention to provide stable liquid suspensions of water soluble polymers that are useable over a wide temperature range.

It is also another object of this invention to provide a process for making an improved composition of a stable liquid suspension of a water soluble polymer.

It is a further object of this invention to provide a process which is easier to practice than prior art processes.

In accordance with the present invention a stable liquid suspension of a water soluble polymer is provided comprising an oil, an oil soluble resin, and a water soluble polymer.

In a preferred embodiment the composition also includes silica.

DETAILED DESCRIPTION OF THE INVENTION

The ingredients useful in carrying out this invention comprise oils, resins, polymers, and silica. Generally speaking, the practice of this invention consists of mixing a suitable oil, suitable resin, suitable polymer, and preferably suitable silica in appropriate quantities in order to form the new composition of the invention-a stable liquid suspension of water soluble polymer. The new composition so formed does not generally require additional processing in order to be used. Because of its exceptional stability the liquid suspension of the invention can be prepared and shipped to customers ready to use and do not need to be prepared in the field.

The oils useful in the practice of this invention broadly include all hydrocarbon oils. Examples of such oils are vegetable oils, crude oil, diesel, kerosene, pentane, decane, soybean oil, corn oil and the like.

However, the preferred oils for purposes of this invention are kerosene, light diesel oil, heating oil, mineral oil, diesel, and iso-paraffins. Most particularly preferred are the iso-paraffins. Examples of distinctly preferred iso-paraffins include but are not limited to tetradecane, hexadecane, dodecane, mixed iso-paraffins, mixed $C_{13}$-$C_{14}$ iso-paraffins, $C_{14}$ iso-paraffin, and $C_{16}$ iso-paraffin.

Generally, all oil soluble resins are useful in the practice of this invention. Examples of such oil soluble resins include styrene isoprene copolymer, styrene ethylene/propylene block copolymer, styrene isobutylene copolymer, styrene butadiene copolymer, polybutylene, polystyrene, polyethylene-propylene copolymer, and like compounds.

Preferred, however, are block copolymers, examples of which include but are not limited to styrene ethylene/propylene block copolymer, hydrogenated styrene-isoprene block copolymers and styrene butadiene copolymer. Most particularly preferred are hydrogenated styrene-isoprene block copolymers, examples of which include but are not limited to materials sold under the trademarks "BARARESIN VIS" (trademark of Baroid Corporation), "SHELLVIS 40" and "SHELLVIS 50" (both trademarks of Shell Chemical Company).

All water soluble polymers are useful in the practice of this invention. Examples of such polymers and the methods for producing and/or obtaining them are disclosed in Bishop U.S. Pat. No. 4,735,659, which is incorporated herein by reference for all purposes. Particularly preferred is carboxymethyl cellulose (CMC).

Water soluble polymers which are suitable for use in the invention are well known in the art. The polymer should be in its solid state and in general be of a particle size with a diameter in the range of 1 to 1,000 microns.

Such water soluble polymers are selected from the group consisting of the cellulose ethers, starches, gums, vinyl polymers, acrylic polymers, and biopolysaccharides.

Examples of suitable cellulose ethers are those selected from the group consisting of carboxymethylcellulose, methylcellulose, carboxymethylhydroxyethylcellulose, hydroxypropylmethylcellulose, hydroxypropylcellulose, hydroxyethylcellulose, ethylhydroxycellulose, and the like.

Examples of suitable starches include those selected from the group consisting of carboxymethylstarch, hydroxyethylstarch, and hydroxypropylstarch.

Examples of suitable gums are those selected from the group consisting of arabic, trajacanth, karaya, shatti, locust bean, guar, psyllium seed, quince seed, agar, algin, carrageenin, furcellaran, pectin, gelatin, and larch gum.

Examples of suitable acrylic polymers are those selected from the group consisting of polyacrylic acid, polyacrylamide, acrylamide-acrylic acid, acrylamide-methacylic acid and acrylonitrile.

Examples of suitable vinyl polymers are those selected from the group consisting of polyvinylpyrrolidone, polyvinyl alcohol, and carboxyvinyl polymers.

The biopolymers useful in this invention are biopolymers produced by a process comprising the microbial transformation of a carbohydrate with a microorganism to obtain a polymeric material which differs from the parent polymeric material in respect of composition, properties and structure. Suitable carbohydrates include sugars such as pentoses or hexoses, for example glucose, sucrose, fructose, maltose, lactose, galactose, and starches, for example soluble starch, corn starch and the like. Crude products having a high carbohydrate concentration can be used. Among suitable materials there may be mentioned raw sugar, crude molasses and the like. Microorganisms suitable for effecting the microbial transformation of the carbohydrates may be pathogenic plant bacteria such as plant pathogens which produce exudates on the site of lesions on infected plants. Typical of such microorganisms are the species of the genus Xanthomonas. Thus, for example a heteropolysaccharide biopolymer may be prepared from glucose by the action of *Xanthomonas campestris* (XC polymer). Commercially available xanthan gum biopolymers can be obtained from Kelco Div., Merck & Co., Inc. under the trademark of "Kelzan" and General Mills, Inc. under the trademark "Biopolymer XB23". Other species of Xanthomonas bacteria which are useful in preparing the biopolymers include *Xanthomonas phaseoli, Xanthomonas mulvacearn, Xanthomonas carotae, Xanthomonas translucens, Xanthomonas hederae* and *Xanthomonas papavericoli*. Other biopolymers, so-called synthetic gums, which are useful in this invention: gum dextran synthesized by the action of the bacterium known as genus Leuconostoc Van Tieghement on sucrose, as described by Bailey et al. in U.S. Pat. No. 2,360,237, phosphorylated mannan synthesized by the action of the yeast *Hansenula holstii* NRRL-Y2448 on glucose as disclosed in U.S. Dept. of Agriculture, Agricultural Research Service, Northern Utilization Research and Development Division, Peoria, Ill., Bulletin CA-N-7, October 1958; gums produced by the action of diphtheriodic bacteria such as *Arthrobacter viscous* NRRL B-1973 and *Arthrobacter viscous* NRRL B-1797 as disclosed in Cadmus et al. U.S. Pat. No. 3,228,855; gum produced by the action of *Methylomonas mucosa* as described in Finn et al. U.S. Pat. No. 3,923,782; gum produced by the action of *Erwinia tahitica* as disclosed in Kang et al. U.S. Pat. No. 3,933,788; and gum produced by the action of *Azotobacter indicus* var. Myxogenes as disclosed in Kang et al. U.S. Pat. No. 3,960,832.

Examples of suitable biopolysaccharides include those selected from the group consisting of a polysaccharide produced by the action of *Xanthomonas campestris, Xanthomonas phaseoli, Xanthomonas mulvacearn, Xanthomonas carotae, Xanthomonas translucens, Xanthomonas hederae, Xanthomonas papavericoli, Hansenula holstii, Arthorobacter viscous, Methylomonas mucosa, Erwinia tahitica* and *Azotobacter indicus*.

The silica useful for the practice of this invention generally includes fumed silicas, colloidal silicas, and precipitated silicas. Preferred, however, are fumed silicas, hydrophyllic fumed silica, and hydrophobic fumed silica. Distinctly preferred is hydrophobic fumed silica. Examples of this class of silica, method for making it, and other pertinent information relating to its useage is disclosed in Bishop U.S. Pat. No. 4,735,659 incorporated herein by reference.

Blending of the chosen water soluble polymer with hydrophobic fumed silica can be carried out in any manner so long as the particles are coated with the hydrophobic fumed silica.

The concentration of hydrophobic fumed silica in the final composition should be in the range of 0.1-10 weight percent, preferably 1-2% if the polymer is a cellulose ether, a starch, a vinyl polymer or an acrylic polymer. The preferred range is 2.5-3.5% if the polymer used is a gum or biopolysaccharide.

The ranges of the ingredients listed above useful in the practice of this invention are as shown in Table 1 below.

TABLE 1

| Composition Components[b] | Broad (%)[a] | Preferred (%) | Most Preferred (%) |
|---|---|---|---|
| Oil | 40–95 | 55–60 | 57–59 |
| Resin | 0.2–10 | 1.8–5 | 2–2.5 |
| Water Soluble Polymer | 3–60 | 37–45 | 38–40 |
| Silica | 0–10 | 0.5–1 | 0.7–1.0 |

[a]All weights in Table I are in weight percent.
[b]The ranges of the composition components shown in Table I are all physical mixtures. No reactions occur and yields remain 100%.

The reaction conditions for carrying out the practice of the invention are as follows: The temperature is generally in the range of about −10° C. to about 200° C., with a preferred range of about 0° C. to about 150° C., and a most preferred range of about 60° C. to about 70° C. The reaction time is generally in the broad range of about 0.05 hours to about 200 hours, with a preferred range of about 0.25 hours to about 20 hours, and a most preferred range of about 1 hour to about 2 hours. It is noted that the reaction time is generally inversely proportional to the reaction temperature i.e., the lower the temperature the more time is required.

In one embodiment, the process of this invention comprises introducing a suitable oil into a suitable mixing device and adding a suitable resin to the oil in the mixing device. The oil-resin mixture is then mixed for about 30–45 minutes at a temperature range of about 60° C. to about 70° C. To this oil-resin mixture is then added a polymer blend comprising about 98 weight percent of a water soluble polymer and 2 weight percent hydrophobic fumed silica. The end product of this process comprising a stable liquid suspension of a water soluble polymer can then be collected by any technique known in the art. While the order of mixing is not a critical aspect of this invention, it is preferred to add the oil first and the polymer last.

The addition of an anitoxidant, a surfactant, a biocide, or even a minimal amount of an organophyllic clay to these basic ingredients is an option which will be frequently exercised by those of skill in the art.

The product of this invention normally has a gel strength that is capable of suspending particulate matter. Additionally, this gel strength develops very rapidly or almost immediately and is of the type referred to in the art as flat gels. By this is meant that unlike normal gels, its gel strength stays constant or increases only slightly with time and that it has desirable fragile properties evidenced by the ease with which it pours.

The product of this invention is primarily tested by observation for syneresis, pour point, and stability over a wide temperature range. Syneresis can be measured by means of a ruler or other such graduated device. This can be accomplished by inserting the ruler or graduated device through the clear liquid portion of the suspension until it contacts the interface that separates this portion, from the layer containing suspended solids. The thickness of the clear liquid layer, the measure of syneresis, can then be determined directly on the ruler or graduated device.

The following examples further illustrate the various aspects of this invention.

INVENTIVE COMPOSITION 1

This example includes the following components:

| | |
|---|---|
| light isoparrafin oil[1] | 700 g |
| oil soluble resin[2] | 20 g |
| water soluble polymer (CMC)[3] | 387 g |
| Total | 967 g |

[1]Available under the name "SOLTROL 145" (0.8 g/ml) a trademark of Phillips Petroleum Company.
[2]Available under the name "BARARESIN VIS" a trademark of Baroid Corporation.
[3]Available under the name "DRISPAC REGULAR" a trademark of Phillips Petroleum Company.

The oil soluble resin was sheared into the light isoparrafin oil with a Ross mixer at a setting of 5 until the temperature reached 140° F. (60° C.). The mixer was then shut off and the mixture allowed to cool to near room temperature. Shearing was then continued until all of the oil soluble resin was incorporated (visual observation). The carboxymethyl cellulose (CMC) was then blended into the mixture.

The sample was then split into three (3) 1-pint units. Unit 1 was then vibrated for three (3) days to simulate transport. Very slight syneresis was noted but no settling was observed. Unit 2 was placed in a freezer at −20° F. (−29° C.) until the temperature stabilized. No syneresis or settling was observed and the sample remained pourable. Unit 3 was placed in an oven at 120° F. (49° C.) and static aged for six months. About ⅛" syneresis was observed but no hard settling was observed.

This demonstrates that a stable liquid suspension of a water soluble polymer is obtained. While some syneresis occurred, no precipitation occurred. This composition has better stability than presently commercially available suspensions of water soluble polymers.

INVENTIVE COMPOSITION 2

This composition comprises the following components:

| | |
|---|---|
| light isoparrafin oil[1] | 9845 g |
| oil soluble resin[2] | 351.6 g |
| water soluble polymer and silica[3] | 6803.5 g |

[1]Available under the name "SOLTROL 170" a trademark of Phillips Petroleum Company.
[2]Available under the name "BARARESIN VIS" a trademark of Baroid Corporation.
[3]Available under the name Liquid "DRISPAC PLUS" a trademark of Phillips Petroleum Company. This essentially consists of CMC dusted with 2 weight percent hydrophobic fumed silica.

The oil soluble resin was added to the isoparrafin oil and mixed on a Ross mixer until the mixture temperature reached 62° C. (143.6° F.). The mixture of water soluble polymer and silica was then added to the oil/resin mixture and blended well. Three 1-pint samples were then taken from the mixture. Sample No. 1 of these three samples was vibrated for three (3) days to simulate transport. No syneresis or settling was observed after a six month period. A portion of Sample No. 1 was also heat aged at 120° F. (49° C.) for six months with no syneresis or settling observed. The temperature was then increased to 150° F. (66° C.) and no syneresis or settling was observed after a two month period. Sample No. 2 of these three samples was placed in a freezer at −20° F. (−29° C.) until the temperature stabilized. No syneresis or settling was observed and the sample remained pourable during the six month period of the tests. The third sample was static shelf aged for 6 months with no syneresis or settling observed.

This demonstrates that the addition of silica to the basic inventive composition is a desirable and useful improvement. This results in a suspension of even greater stability and better properties than the basic inventive composition as shown in Inventive Composition 1.

INVENTIVE COMPOSITION 3

This composition was made identical to Inventive Composition 2 above, except for the omission of silica. Three 1 pint samples were also collected and subjected to the same respective conditions as with those of Inventive Composition 2.

No hard settling was observed in any of these samples. However, about ⅛" syneresis was observed in the samples that were heat aged and/or static shelf aged for six months.

This demonstrates that this composition although stable, is less so than the composition containing silica.

INVENTIVE COMPOSITION 4

This composition comprises the following components:

| | |
|---|---|
| light isoparrafin oil[1] | 560 g |
| oil soluble resin[2] | 20 g |
| water soluble polymer[3] | 387 g |
| silica | 2 wt % |

[1]Available under the name "SOLTROL 170" a trademark of Phillips Petroleum Company.
[2]Available under the name "BARARESIN VIS" a trademark of Baroid Corporation.
[3]Available under the name "KELZAN" a trademark of Kelco Division, Merck and Company. This is a xanthan gum biopolymer. The xanthan gum biopolymer was predusted with a 2 wt % hydrophobic fumed silica.

The light isoparrafin oil was blended with the oil soluble resin on a high shear Ross mixer until all the resin predusted with the silica, was incorporated and the temperature stabilized at 62° C. (143.6° F.). A split of the sample was taken and placed in a freezer at −20° F. (−29° C.) for test of pour point. It poured at −20° F. (−29° C.) and remained pourable after 6 months.

A split of the sample was taken and placed in an oven at a temperature of 120° F. (49° C.) for six months. No syneresis or settling was observed. After 6 months, the oven temperature was increased to 150° F. (66° C.). No increase in syneresis and no settling was observed eight weeks later.

This demonstrates that stable liquid suspensions of xanthan gum biopolymers can be made by employing the method and components of this invention.

INVENTIVE COMPOSITION 5

This formulation was made identical to that of Inventive Composition 4 except for the substitution of the xanthan gum biopolymer with a polyacrylamide. The samples were tested under similar conditions as in Inventive Composition 4. Results obtained were similar to those of Inventive Composition 4.

This example further demonstrates that another kind of water soluble polymer is useful in the practice of this invention.

INVENTIVE COMPOSITION 6

This formulation was made identical to that of Inventive Composition 4 except for the substitution of the xanthan gum biopolymer with carboxymethyl hydroxyethyl cellulose. The samples were likewise tested under similar conditions as those of Inventive Composition 4. Similar results were obtained.

This example additionally demonstrates that all water soluble polymers are useful in the practice of this invention.

While this invention has been described in detail for the purpose of illustration, it is not to be construed as limited thereby but is intended to cover all changes and modifications within the spirit and scope thereof.

That which is claimed is:

1. A stable liquid suspension of water soluble polymer comprising:
   a) an oil selected from the group consisting of diesel, kerosene, heating oil, decane, tetradecane, hexadecane, dodecane, mixed $C_{13}$–$C_{14}$ isoparaffins, $C_{14}$ isoparaffins, $C_{16}$ isoparaffins, soybean oil and corn oil, wherein said oil is present in the range of from 40 weight percent to 95 weight percent;
   b) an oil soluble resin selected from the group consisting of styrene-isoprene copolymers, hydrogenated styrene-isoprene block copolymers, styrene ethylene/propylene block copolymers, styrene isobutylene copolymers, styrene butadiene copolymers, polybutylene and polystyrene, polyethylene-propylene copolymers, wherein said oil soluble resin is present in the range of from 0.2 weight percent to 10 weight percent;
   c) a water soluble polymer selected from the group consisting of cellulose ethers, gums, starches, vinyl polymers, acrylic polymers and biopolysaccharides, wherein said water soluble polymer is present in the range of from 3 weight percent to 60 weight percent, wherein the total of all weight percentages equals 100 weight percent.

2. The stable liquid suspension of claim 1, wherein optionally there is present a silica selected from the group consisting of fumed silica, colloidal silicas and precipitated silicas, wherein said silica is present in the range of from 0 weight percent to 10 weight percent, wherein the total of all weight percentages is 100 weight percent.

3. The stable liquid suspension of claim 2, wherein the silica is a fumed silica.

4. The stable liquid suspension of claim 2, wherein the silica is a hydrophobic fumed silica.

5. The stable liquid suspension of claim 2, wherein the silica is present in the range of from 0.5 weight percent to 1 weight percent, wherein the total of all weight percentages is 100 weight percent.

6. The stable liquid suspension of claim 5, wherein the silica is a fumed silica.

7. A stable liquid suspension of water soluble polymer comprising:
   a) an oil selected from the group consisting of decane, tetradecane, hexadecane, dodecane, mixed $C_{13}$–$C_{14}$ isoparaffins, $C_{14}$ isoparaffins, $C_{16}$ isoparaffins, soybean oil and corn oil, wherein said oil is present in the range of from 40 weight percent to 95 weight percent;
   b) an oil soluble resin selected from the group consisting of styrene-isoprene copolymers, hydrogenated styrene-isoprene block copolymers, styrene ethylene/propylene and styrene butadiene block copolymers, wherein said oil soluble resin is present in the range of from 0.2 weight percent to 10 weight percent;
   c) a water soluble polymer selected from the group consisting of cellulose ethers, gums, starches, vinyl polymers, acrylic polymers and biopolysaccharides, wherein said water soluble polymer is present in the range of from 3 weight percent to 60 weight percent;
   d) a fumed silica, wherein said fumed silica is present in the range of from 0 weight percent to 10 weight percent, wherein the total of all weight percentages equal 100 weight percent.

8. A stable liquid suspension of water soluble polymer comprising:
   a) an oil selected from the group consisting of diesel, kerosene, heating oil, mineral oil, pentane, decane, tetradecane, hexadecane, dodecane, mixed $C_{13}$–$C_{14}$ isoparaffins, $C_{14}$ isoparaffins, $C_{16}$ isoparaffins, soybean oil and corn oil, wherein said oil is present in the range of from 55 weight percent to 60 weight percent;
   b) an oil soluble resin selected from the group consisting of styrene-isoprene copolymers, hydrogenated styrene-isoprene block copolymers, styrene ethylene/propylene block copolymers, styrene isobutylene copolymers, styrene butadiene copolymers, polybutylene and polystyrene, polyethylene-propylene copolymers, wherein said oil soluble resin is present in the range of from 1.8 weight percent to 5 weight percent;
   c) a water soluble polymer selected from the group consisting of cellulose ethers, gums, starches, vinyl polymers, acrylic polymers and biopolysaccharides, wherein said water soluble polymer is present in the range of from 37 weight percent to 45 weight percent, wherein the total of all the weight percentages equals 100 weight percent.

9. The stable liquid suspension of claim 8, wherein optionally there is present a silica selected from the group consisting of fumed silica, colloidal silicas, and precipitated silicas, wherein said silica is present in the range of from 0.5 weight percent to 1 weight percent; wherein the total of all the weight percentages equals 100 weight percent.

10. The stable liquid suspension of claim 8, wherein the silica is a fumed silica.

11. The stable liquid suspension of claim 9, wherein the silica is a hydrophobic fumed silica.

12. A stable liquid suspension of water soluble polymer comprising:
   a) an oil selected from the group consisting of decane, tetradecane, hexadecane, dodecane, mixed $C_{13}$–$C_{14}$ isoparaffins, $C_{14}$ isoparaffins, $C_{16}$ isoparaffins, soybean oil and corn oil, wherein said oil is present in the range of from 55 weight percent to 60 weight percent;
   b) an oil soluble resin selected from the group consisting of styrene-isoprene copolymers, hydrogenated styrene-isoprene block copolymers, styrene ethylene/propylene and styrene butadiene block copolymers, wherein said oil soluble resin is present in the range of from 1.8 weight percent to 5 weight percent;
   c) a water soluble polymer selected from the group consisting of cellulose ethers, gums, starches, vinyl polymers, acrylic polymers and biopolysaccharides, wherein said water soluble polymer is present in the range of from 37 weight percent to 45 weight percent;
   d) a fumed silica, wherein said fumed silica is present in the range of from 0.5 weight percent to 1 weight percent; wherein the total of all the weight percentages equals 100 weight percent.

13. A stable liquid suspension of water soluble polymer as in claim 12, wherein the oil is an iso-paraffinic oil selected from the group consisting of tetradecane, hexadecane, dodecane, mixed iso-paraffins, mixed $C_{13}$–$C_{14}$ isoparaffins, $C_{14}$ isoparaffins and $C_{16}$ isoparaffins.

14. A stable liquid suspension of water soluble polymer as in claim 12, wherein the water soluble polymer is carboxymethylcellulose (CMC).

15. A stable liquid suspension of water soluble polymer comprising:
  a) an isoparaffinic oil present in an amount ranging from about 57 to about 59 weight percent; wherein the total weight percentages total 100 weight percent;
  b) hydrogenated styrene-isoprene block copolymer present in an amount ranging from about 2 to about 2.5 weight percent; and
  c) carboxymethyl cellulose (CMC) present in an amount ranging from about 38 to about 40 weight percent.

16. A stable liquid suspension of water soluble polymer as in claim 15, wherein the oil is an iso-paraffinic oil selected from the group consisting of tetradecane, hexadecane, dodecane, mixed $C_{13}$–$C_{14}$ isoparaffins, $C_{14}$ isoparaffins and $C_{16}$ isoparaffins.

17. A stable liquid suspension of water soluble polymer as in claim 15, wherein additionally present is hydrophobic fumed silica.

18. A stable liquid suspension of water soluble polymer as in claim 12, wherein:
  a) said oil is present in an amount within the range of about 57 to about 59 weight percent;
  b) said oil soluble resin is present in an amount within the range of about 2 to about 2.5 weight percent;
  c) said water soluble polymer is present in an amount within the range of about 38 to about 40 weight percent; and
  d) said silica is present in an amount within the range of about 0.7 to about 1 weight percent; wherein the total of all the weight percentages equals 100 weight percent.

19. A process for preparing a stable liquid suspension of a water soluble polymer comprising the following steps:
  a) mixing an oil selected from the group consisting of kerosene, heating oil, decane, tetradecane, hexadecane, dodecane, mixed $C_{13}$–$C_{14}$ isoparaffins, $C_{14}$ isoparaffins, $C_{16}$ isoparaffins, soybean oil and corn oil, wherein said oil is present in the range of from 40 weight percent to 95 weight percent; with
  an oil soluble resin selected from the group consisting of styrene-isoprene copolymers, hydrogenated styrene-isoprene block copolymers, styrene ethylene/propylene block copolymers, styrene isobutylene copolymers, styrene butadiene copolymers, polybutylene and polystyrene, polyethylene-propylene copolymers, wherein said oil soluble resin is present in the range of from 0.2 weight percent to 10 weight percent; and
  a water soluble polymer selected from the group consisting of cellulose ethers, gums, starches, vinyl polymers, acrylic polymers and biopolysaccharides, wherein said water soluble polymer is present in the range of from 3 weight percent to 60 weight percent, wherein the total of all weight percentages equals 100 weight percent; to blend the oil soluble resin and water soluble polymer with the oil thereby forming an intermediate mixture; then
  b) heating the intermediate mixture for a suitable amount of time at a suitable temperature to form a stable liquid suspension.

20. The process of claim 19 wherein the water soluble polymer has mixed therewith a silica selected from the group consisting of fumed silica, colloidal silicas and precipitated silicas, wherein said silica is present in the range of from 0 weight percent to 10 weight percent, wherein the total of all weight percentages is 100 weight percent.

21. The process of claim 20, wherein the silica is a fumed silica.

22. The process of claim 20, wherein the silica is a hydrophobic fumed silica.

23. The process of claim 20, wherein the silica is present in the range of from 0.5 weight percent to 1 weight percent, wherein the total of all weight percentages is 100 weight percent.

24. The process of claim 23, wherein the silica is a fumed silica.

25. A process for preparing a stable liquid suspension of water soluble polymer comprising the following steps:
  a) mixing an oil selected from the group consisting of decane, tetradecane, hexadecane, dodecane, mixed $C_{13}$–$C_{14}$ isoparaffins, $C_{14}$ isoparaffins, $C_{16}$ isoparaffins, soybean oil and corn oil, wherein said oil is present in the range of from 40 weight percent to 95 weight percent; with
  an oil soluble resin selected from the group consisting of styrene-isoprene copolymers, hydrogenated styrene-isoprene block copolymers, styrene ethylene/propylene and styrene butadiene block copolymers, wherein said oil soluble resin is present in the range of from 0.2 weight percent to 10 weight percent; and
  a water soluble polymer selected from the group consisting of cellulose ethers, gums, starches, vinyl polymers, acrylic polymers and biopolysaccharides, wherein said water soluble polymer is present in the range of from 3 weight percent to 60 weight percent; which has been previously mixed with a fumed silica, wherein said fumed silica is present in the range of from 0 weight percent to 10 weight percent, wherein the total of all weight percentages equals 100 weight percent, to blend the oil soluble resin and water soluble polymer with the oil thereby forming an intermediate mixture; then
  b) heating the intermediate mixture for a suitable amount of time at a suitable temperature to form a stable liquid suspension.

26. A process for forming a stable liquid suspension of water soluble polymer comprising the following steps:
  a) mixing an oil selected from the group consisting of diesel, kerosene, heating oil, mineral oil, pentane, decane, tetradecane, hexadecane, dodecane, mixed $C_{13}$–$C_{14}$ isoparaffins, $C_{14}$ isoparaffins, $C_{16}$ isoparaffins, soybean oil and corn oil, wherein said oil is present in the range of from 55 weight percent to 60 weight percent; with
  an oil soluble resin selected from the group consisting of styrene-isoprene copolymers, hydrogenated styrene-isoprene block copolymers, styrene ethylene/propylene block copolymers, isobutylene copolymers, styrene butadiene copolymers, styrene polybutylene and polystyrene, polyethylene-propylene copolymers, wherein said oil soluble resin is present in the range of from 1.8 weight percent to 5 weight percent; and a water soluble polymer selected from the group consisting of cellulose ethers, gums, starches, vinyl polymers, acrylic polymers and biopolysaccharides, wherein said water soluble polymer is present in the range of from 37 weight percent to 45 weight percent, wherein the total of all the weight percentages equals 100 weight percent; to blend the oil soluble resin and water soluble polymer with the oil thereby forming an intermediate mixture;

b) heating the intermediate mixture for a suitable amount of time at a suitable temperature to form a stable liquid suspension.

* * * * *